(12) United States Patent
Tate

(10) Patent No.: US 6,361,117 B1
(45) Date of Patent: Mar. 26, 2002

(54) ELASTIC SUSPENSION BUCKET SEAT

(75) Inventor: Tom Tate, Reedsburg, WI (US)

(73) Assignee: Seats Incorporated, Reedsburg, WI (US)

( * ) Notice: Subject to any disclaimer, the term of this patent is extended or adjusted under 35 U.S.C. 154(b) by 0 days.

(21) Appl. No.: 09/556,932

(22) Filed: Apr. 21, 2000

(51) Int. Cl.[7] ................................................ A47C 7/22
(52) U.S. Cl. ................................................ 297/452.56
(58) Field of Search ....................... 297/452.52, 452.56, 297/452.18

(56) References Cited

U.S. PATENT DOCUMENTS

| | | | | |
|---|---|---|---|---|
| 3,560,049 A | * | 2/1971 | Burton | 297/452.52 X |
| 4,492,408 A | * | 1/1985 | Lohr | 297/452.56 X |
| 4,603,907 A | * | 8/1986 | Witzke | 297/452.56 |
| 5,338,091 A | * | 8/1994 | Miller | 297/452.56 X |
| 5,439,271 A | * | 8/1995 | Ryan | 297/452.56 |
| 6,152,534 A | * | 11/2000 | Maeda et al. | 297/452.56 |

* cited by examiner

Primary Examiner—Peter R. Brown
(74) Attorney, Agent, or Firm—Michael Best & Friedrich LLP

(57) ABSTRACT

A seat assembly includes a support structure supporting a layer of cushioning material. The support structure comprises a base, a pair of web supports mounted to the base with fasteners, a pair of connector bars interconnecting the web supports, and a web of fabric material extending between the connector bars. Engaging members are joined to the web and include hook portions that facilitate interconnecting the web with the connector bars. The layer of cushioning material is supported by the web.

11 Claims, 3 Drawing Sheets

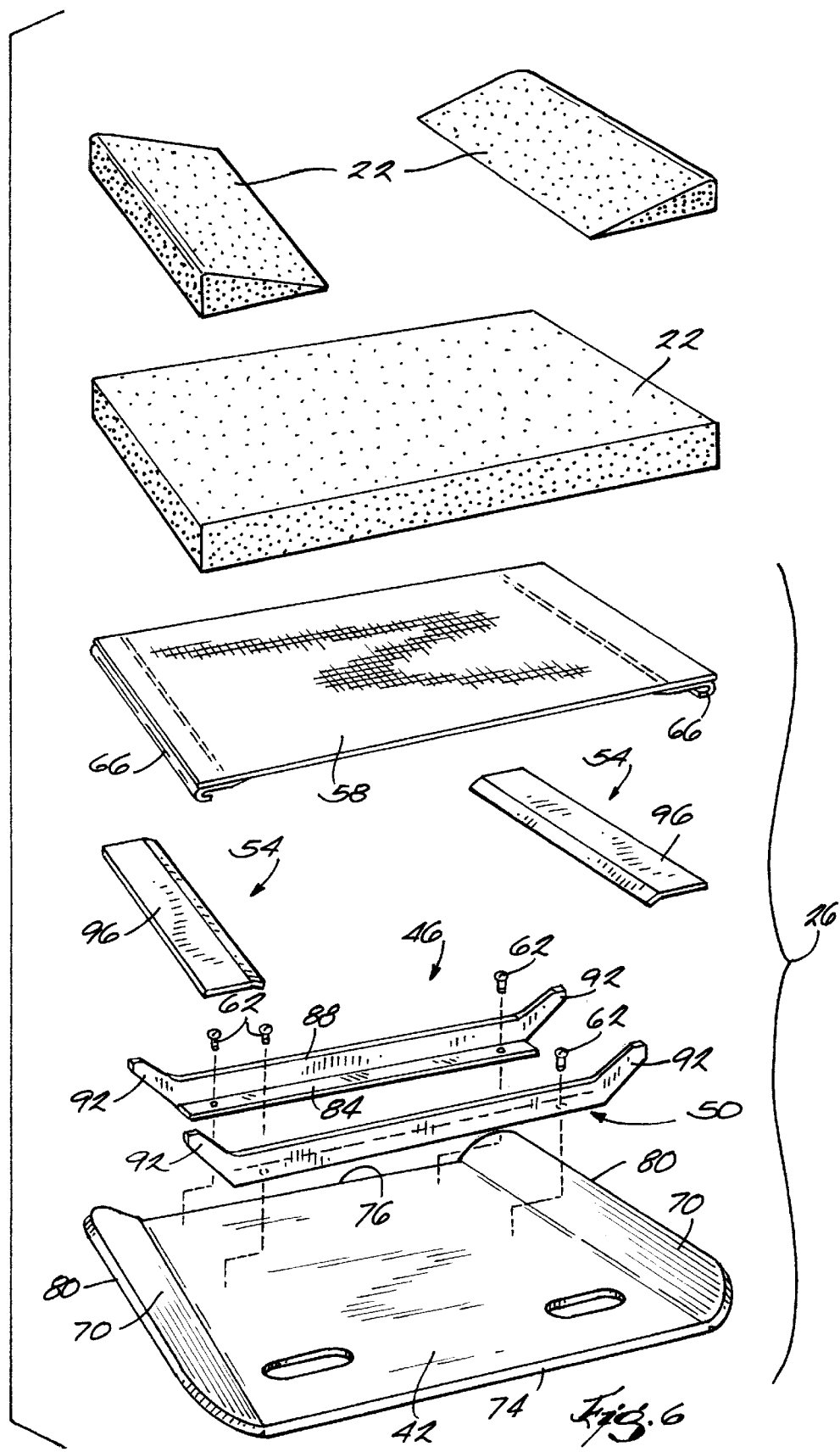

U.S. 6,361,117 B1

ELASTIC SUSPENSION BUCKET SEAT

FIELD OF THE INVENTION

The invention relates to seats for use in a vehicle and more particularly to the construction of the support structure in a vehicle seat for supporting the foam padding or cushioning used in the seat.

BACKGROUND PRIOR ART

In relatively small vehicles such as skid steer loaders, small construction equipment and lawn care implements as well as in other similar products, it is important to provide a relatively compact seat for the operator, but a seat which is comfortable for the operator during long work periods.

Prior art seats for such machines or vehicles are commonly constructed with a seat cushion formed directly on a cushion board or on a pair of upwardly arched sinusoidal springs in turn supported by a cushion board. The sinusoidal springs have opposite ends attached to the cushion board, and the sinusoidal springs in turn support padding or cushioning material which is covered by the vinyl exterior material of the seat cushion.

SUMMARY OF THE INVENTION

The invention provides an improved seat or cushion for use in vehicles such as skid steer loaders and the like, and seat having a construction which is more comfortable for the operator. More particularly, the invention relates to a vehicle seat construction which includes an improved assembly for supporting the padding or foam material used in the seat and provides a seat construction which is compact and low profile yet provides a comfortable support for the operator and reduces vibration loads transmitted to the vehicle operator.

The improved support assembly includes a cushion board or base, a fabric web, supports, and brackets mounted on the supports. The fabric web is stretched tightly across the seat between the brackets and in spaced relation from the base. The fabric web in turn supports foam cushion material or other padding, and the foam material or padding is covered by vinyl or another wear-resistant material.

One of the advantages of the invention is that it provides a compact, low profile suspension or support assembly which can be used in the production of seats for vehicles with confined volume. The invention also provides a comfortable seat platform for the operator despite the compact configuration of the seat.

The improved support assembly also provides a strong but resilient support for the cushioning material to facilitate long life or durability of the cushioning material or foam material used in the seat. The improved support assembly forms a stable support for the cushion material and distributes forces across a broad surface area of the cushion material. This reduces the occurrence of localized areas of stress on the cushion material and resists breakdown of the cushioning material. This in turn permits the use of less foam material compared to known support assemblies while still providing uniform comfort across the width of the seat.

The improved support assembly also facilitates construction of a seat which can have a reduced vertical thickness yet provide a comfortable seat surface.

BRIEF DESCRIPTION OF THE DRAWINGS

FIG. 6 is an exploded view of the foam padding and support assembly used in the seat of FIG. 1.

DESCRIPTION OF A PREFERRED EMBODIMENT

Figure 1:
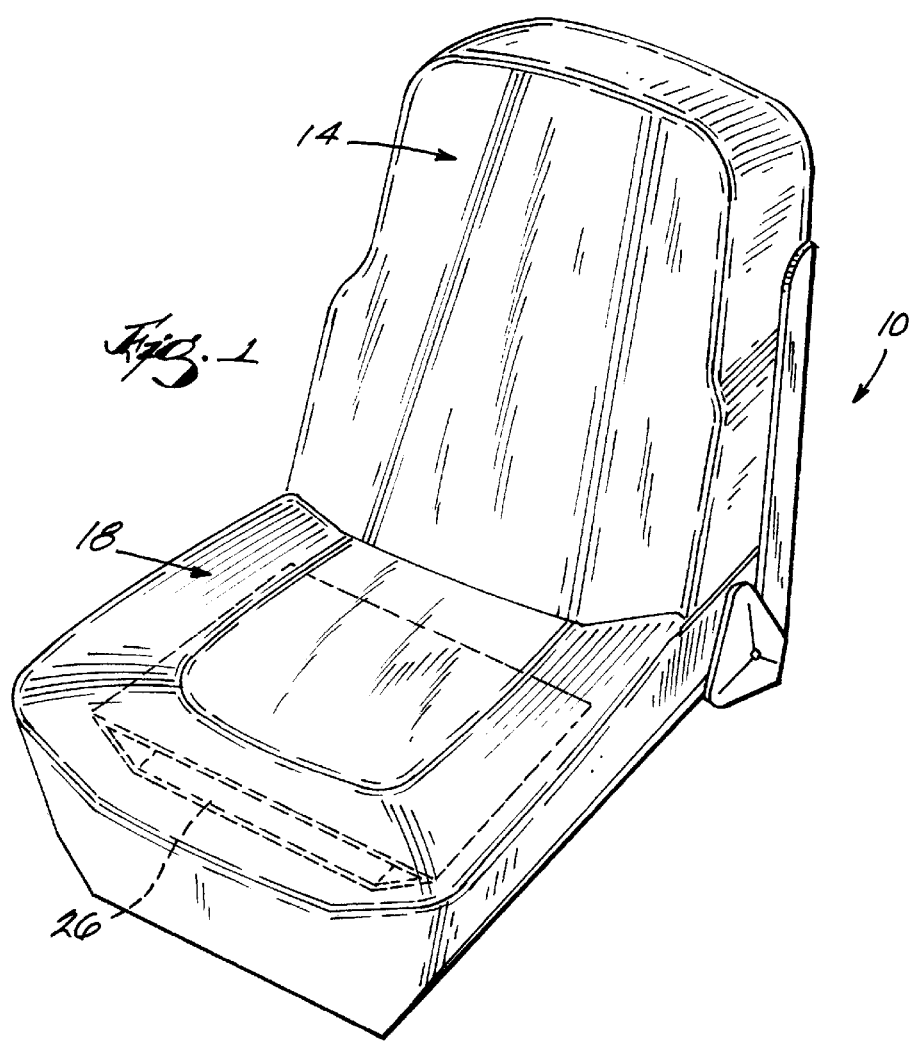
FIG. 1 is a perspective view of a vehicle seat embodying the invention.

FIG. 1 shows a seat 10 embodying the invention and of the type which can be employed in small construction vehicles and other similar products. Such construction vehicles can include skid steer loaders and lawn maintenance equipment as well as other types of construction equipment. The seat includes a backrest portion 14 and a bottom cushion portion 18. The bottom cushion portion 18 generally includes a plurality of foam cushions or padding 22 (not seen in FIG. 1, but illustrated in FIG. 6) and a support structure 26 supporting the foam padding 22. A layer of vinyl, leather, synthetic leather, fabric, or other conventional seat covering material covers the support structure 26 and the layers of foam padding 22 to provide an aesthetically pleasing appearance. The specific construction of the support structure 26 is discussed in more detail below.

Figure 2:
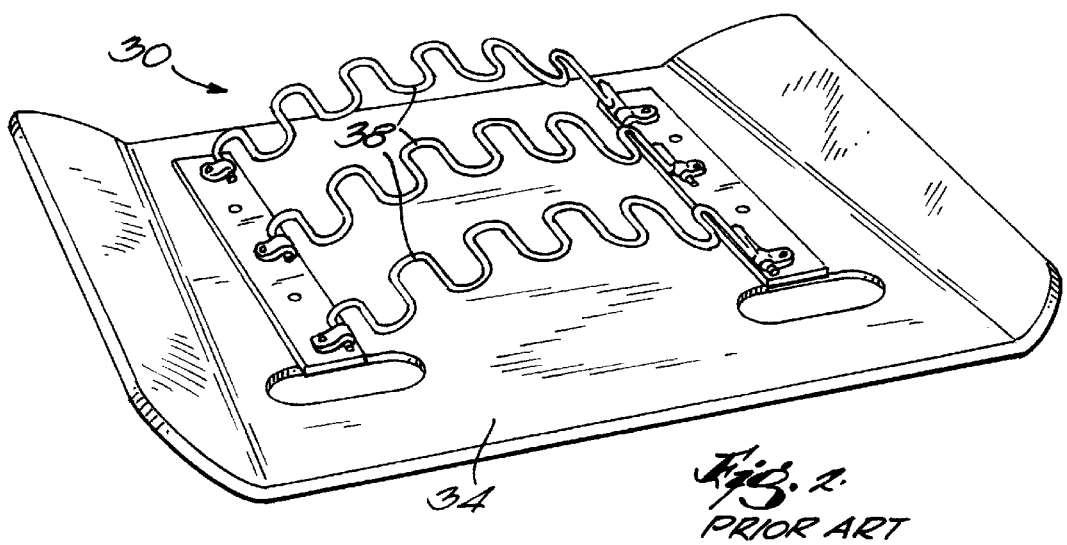
FIG. 2 is a perspective view of a spring and cushion board assembly for a prior art seat arrangement.

FIG. 2 illustrates a prior art support structure 30 for a layer of foam to be used in the bottom cushion portion of a seat. More particularly, the prior art support structure includes a cushion board or base 34 and three arched springs 38 supported by the base 34. The arched springs 38 in turn support the layer of foam padding. The arched springs 38 each comprise a sinusoidally curved spring with opposite ends fixed to the base 34. The springs 38 extend across a central portion of the width of the base 34 and the springs 38 are curved to define an arch or convex surface for supporting the layer of foam padding of the seat;

FIG. 6 illustrates the components of the bottom cushion portion 18 of the seat 10. As mentioned above, the bottom cushion portion 18 includes the layers of foam padding 22 supported by the support structure 26. The support structure 26 includes a cushion board or base 42, a first or rear web support or brace 46, a second or front web support or brace 50, a pair of connector bars or brackets 54, and a web 58. The web supports 46, 50 are mounted to the base 42 with suitable fasteners 62, and the web 58 is mounted on the web supports 46, 50 with engaging members 66 to support the web 58 in spaced relation to the base 42 as discussed below.

Figure 3:
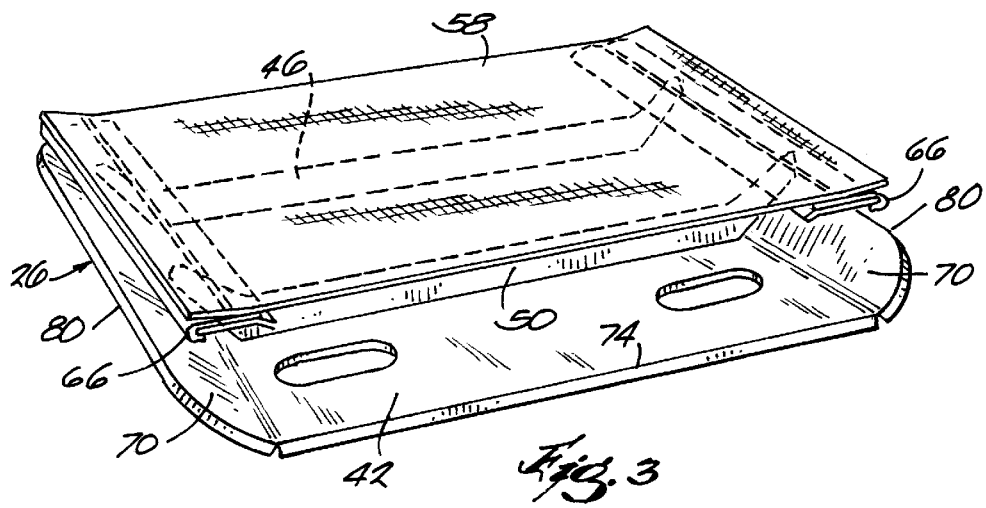
FIG. 3 is a perspective view of a support assembly used in the seat shown in FIG. 1.
Figure 4:
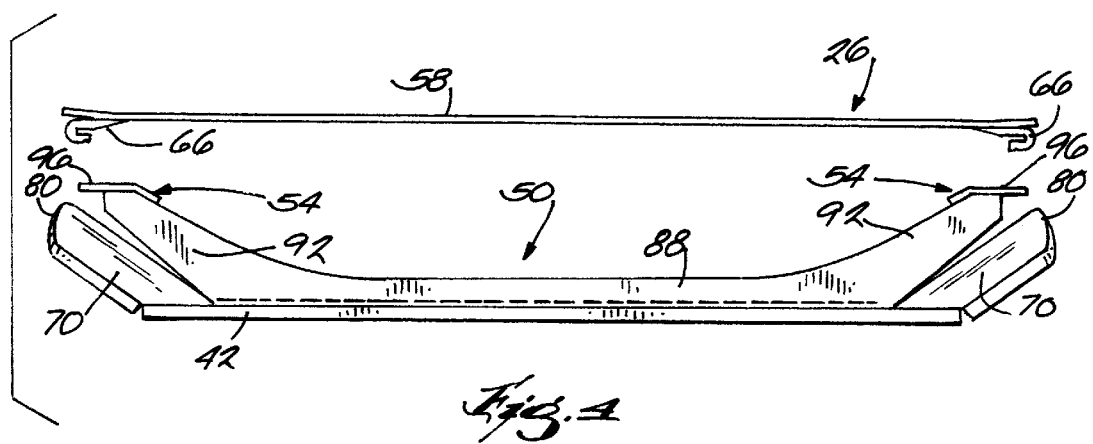
FIG. 4 is a view similar to FIG. 3 but showing the fabric web of the support assembly removed.

With reference to FIGS. 3, 4, and 6, the base 42 has opposite sides 70 which are curved upwardly. In a preferred form of the invention, the base 42 is formed from plywood but other suitable materials such as plastic, fiberglass, or steel could be used. The base 42 includes front and rear edges 74, 76, respectively, and opposite edges 80 spaced apart by the width of the rear seat.

Referring now to FIGS. 4 and 6, the illustrated web supports 46, 50 are angle members having an L-shaped cross section. An attachment portion 84 of each web support 46, 50 is mounted to the base 42 with the fasteners 62. Alternatively, the web supports 46, 50 could be welded to, integrally formed with, or otherwise permanently affixed to the base 42. The web supports 46, 50 also each include a vertical portion 88 extending upwardly from and integral with the elongated attachment portion 84. The vertical portion 88 includes a middle portion and opposite end portions 92. The opposite end portions 92 are curved upwardly and are higher or raised with respect to the middle portion. The first web support 46 is secured near the rear edge 76 of the base 42 and the second web support 50 is fixed inwardly of the front edge 74 of the base 42. The web supports 46, 50 are spaced from and parallel to each other, and extend across the base 42 from side to side.

Figure 5:
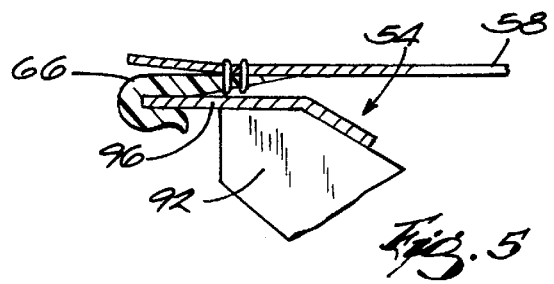
FIG. 5 is an enlarged cross-sectional view of a portion of the support assembly shown in FIG. 3.

As seen in FIGS. 3 and 6, the connector bars 54 are welded to the ends 92 of the web supports 46, 50, causing the web supports 46, 50 to be joined. The connector bars 54 extend rearwardly of the first web support 46 about 0.5 inches, and extend forwardly of the second web support 50 about 2.5 inches. In this regard, the connector bars 54 are cantilevered with respect to the web supports 46, 50. With additional reference to FIG. 5, the connector bars 54 include generally horizontal edge portions or flanges 96 extending outwardly of the ends 92 of the web supports 46, 50. The web 58 is a fabric elastic suspension web which is stretched between the edges of the flanges 96. In a preferred form of the invention, the web 58 is a woven textile fabric formed from nylon or other high strength fibers.

Referring to FIGS. 3–6, The engaging members 66 are secured to the opposite ends of the web 58 to permit the web to be stretched tightly across the web supports 46, 50 and between the flanges 96 at the opposite sides of the support structure 26. In a preferred form of the invention, the engaging members 66 are stitched to the fabric. The engaging members 66 comprise plastic strips having a hook shaped lip adapted to extend over and engage the outwardly facing edges of the horizontal flanges 96 of the connector bars 54.

The fabric web 58 supports the foam cushion layers 22 arranged to form the desired contour of a bucket seat. The foam cushion material is conventional foam padding employed in seating and upholstery cushions.

What is claimed is:

1. A seat for use in a vehicle, the vehicle seat comprising a seat cushion, the seat cushion including:
   a base;
   a pair of laterally spaced brace members each having a central portion secured to the base and opposite end portions extending upwardly from the central portion;
   a pair of elongated brackets secured to and extending between the end portions of the brace members, the brackets including a cantilevered portion extending outwardly therefrom;
   a fabric web stretched between the cantilevered portions, the fabric web having one end attached to one of the cantilevered portions and an opposite end attached to the other of the cantilevered portions; and
   cushion material supported by the fabric web.

2. A vehicle seat as set forth in claim 1, wherein the base includes opposite sides, a front portion and rear portion and wherein the bracket includes a first brace fixed to the base at a rear portion of the base, and a second brace fixed to the base at a front portion of the base.

3. A vehicle seat as set forth in claim 2, wherein a portion of the bracket is cantilevered with respect to the braces.

4. A vehicle seat as set forth in claim 1, wherein the base comprises a cushion board adapted to be fixed to the vehicle.

5. A vehicle seat as set forth in claim 1, wherein the fabric web is supported by the bracket to be in generally spaced relation from the base and above the base.

6. A vehicle seat as set forth in claim 1, further comprising a pair of engaging members interconnected with opposite side edges of the web, the engaging members being operable to interconnect the web with the bracket.

7. A vehicle seat as set forth in claim 6, wherein the engaging members include a hook portion, and wherein the engaging members are stitched to the web.

8. A bottom cushion assembly for a vehicle seat, the bottom cushion assembly comprising:
   a base;
   a pair of laterally spaced brace members each having a central portion secured to the base and opposite end portions extending upwardly from the central portion;
   a pair of elongated brackets secured to and extending between the end portions of the brace members, the brackets including a cantilevered portion extending outwardly therefrom;
   a web of fabric material extending across a portion of said base and between said cantilevered portions, said web being spaced from and generally parallel to said base;
   a plurality of cushions supported by said web; and
   a cover material covering said web and said cushions.

9. The cushion assembly of claim 8, further comprising engaging members interconnected with said web and operable to interconnect said web with said brackets.

10. The cushion assembly of claim 9, wherein said engaging members include a hook portion, and wherein said engaging members are stitched to the web.

11. The cushion assembly of claim 8, wherein said web is stretched between said brackets.

* * * * *